3,088,924
PROCESS FOR PREPARATION OF AN ION-EXCHANGE MATERIAL FROM THE ACID SLUDGE RESULTING FROM SULPHURIC ACID WASHING OF CRUDE LIGHT OILS
Kshitish Ranjan Chakravorty, Sindri, and Bimal Kumar Dutta, Saharpura, India, assignors to Sindri Fertilizers and Chemicals Limited, Bihar, India, a firm of India
No Drawing. Filed Dec. 21, 1959, Ser. No. 860,693
7 Claims. (Cl. 260—2.1)

This invention relates to a process for the preparation of an ion-exchange material from the acid sludge resulting from sulphuric acid washing of crude light oils and the ion-exchange material thus prepared.

The object of this invention is to prepare an ion-exchange material from the acid sludge obtained from sulphuric acid washing of crude light oils in by-product recovery plants attached to coke-oven industries, and thereby profitably utilise the acid sludge. The ion-exchange material so prepared is capable of removing the hardness of water and reducing the total dissolved solids, and alkalinity to any desired degree. The ion-exchange material can be used over and over again by periodic regeneration. The regeneration can be easily effected by an aqueous solution of common salt or dilute acid, depending upon the nature of the treated water required. The ion-exchange material can act with equal efficiency when used either in sodium cycle or in hydrogen cycle. It can be used in sizes from 0.1 mm. to 5 mm. The present invention offers a profitable utilization of the acid sludge obtained from the industries like coke oven by-product recovery plants, where crude oils are washed with sulphuric acid in one of the refining processes. The acid sludge thus produced is a black, viscous, highly corrosive mass possessing obnoxious odour. Its disposal is a difficult problem and entails additional expenditure for disposal. In recent years a number of materials having the property of ion-exchange has been produced from costly chemicals and procedures. The preparation of an ion-exchange material from the acid sludge as referred above has a great economic advantage as the raw material employed is a factory waste, disposal of which is a long-standing problem in the industry. Another advantage of this process is that the dilute sulphuric acid obtained as a byproduct can be used in a number of ways.

The present invention relates to a process for the preparation of an ion-exchange material from the acid sludge resulting from sulphuric acid washing of crude light oils.

The process consists in—
(1) Heating the acid sludge,
(2) Separating the resinous matter thus formed,
(3) Preliminary purification by disintegration of the resinous matter and washing with water,
(4) Final purification and converting the resinous matter into sodium salt, and
(5) Grading to different sizes.

(1) The heating of the acid sludge is done either indirectly or directly with steam, with or without addition of water at temperature from 50° C. up to 150° C.

(2) The separation of the resinous matter from acid layer is effected by draining out the acid layer from below the resinous layer or removing the resinous layer from the top. The separation is effected at any temperature up to 100° C.

(3) The preliminary purification is done by cooling and disintegrating the lumps of material obtained in (2) above to sizes less than 1.5 cm. in size, washing by water till it is almost acid free.

(4) The final purification and converting to sodium salt is effected by further crushing to sizes less than 5 mm. and washing with a dilute aqueous solution of caustic soda, or sodium carbonate of strength ranging from 0.1 gm. to 10.0 gm. per 100 cc. followed by washing with aqueous solution of common salt of strength ranging from 5 gm. to 35 gm. per 100 cc. and rinsing with water till excess salt is removed.

(5) The grading to different sizes is effected by air drying the material in (4) and screening.

We claim:
1. A process for producing ion-exchange material from acid sludge, consisting essentially in
   (a) heating the acid sludge obtained by the sulfuric acid-washing of crude light oils in by-product recovery plants of coke oven industries, to a temperature in the range of 50° C. to 150° C.,
   (b) separating the resulting supernatant resinous layer from the acid residual layer,
   (c) disintegrating the resulting resinous lumps, and
   (d) washing with water until the resin end product is substantially acid free.
2. A process for producing ion-exchange material from acid sludge, consisting essentially in
   (a) heating the acid sludge obtained by the sulfuric acid-washing of crude light oils in by-product recovery plants of coke oven industries, to a temperature in the range of 50° C. to 150° C.,
   (b) separating the resulting supernatant resinous layer from the acid residual layer,
   (c) disintegrating the resulting resinous lumps to a particle size below 1.5 centimeter, and
   (d) washing with water until the resin end product is substantially acid free.
3. A process for producing ion-exchange material from acid sludge, consisting essentially in
   (a) heating the acid sludge obtained by the sulfuric acid-washing of crude light oils in by-product recovery plants of coke oven industries, to a temperature in the range of 50° C. to 150° C.,
   (b) separating the resulting supernatant resinous layer from the acid residual layer, at a temperature of maximally about 100° C.,
   (c) disintegrating the resulting resinous lumps, and
   (d) washing with water until the resin end product is substantially acid free.
4. A process for producing ion-exchange material from acid sludge, consisting essentially in
   (a) heating the acid sludge obtained by the sulfuric acid-washing of crude light oils in by-product recovery plants of coke oven industries, to a temperature in the range of 50° C. to 150° C.,
   (b) separating the resulting supernatant resinous layer from the acid residual layer,
   (c) disintegrating the resulting resinous lumps to a particle size below 1.5 centimeters,
   (d) washing with water until the resin end product is substantially acid free.
   (e) further comminuting the washed resin to a grain size of less than 5 millimeters, and
   (f) washing the comminuted resin with a dilute aqueous solution of a member of the group consisting of sodium hydroxide and sodium carbonate, of a strength ranging from 0.1 to 10.0 grams per 100 cc. of solution, then washing with an aqueous solution of sodium chloride of a strength ranging from 5 to 35 grams per 100 cc. of solution, and finally rinsing the resulting purified resin with water till excess sodium chloride is removed.
5. A process as described in claim 1 wherein the heating is effected indirectly with steam.
6. A process as described in claim 1 wherein the heating is effected directly with steam.

7. A process for producing ion-exchange material from acid sludge, consisting essentially in
 (a) heating the acid sludge obtained by the sulfuric acid-washing of crude light oils in by-product recovery plants of coke oven industries, to a temperature in the range of 50° C. to 150° C., adding water to the sludge while heating the same,
 (b) separating the resulting supernatant resinous layer from the acid residual layer,
 (c) disintegrating the resulting resinous lumps, and
 (d) washing with water until the resin end product is substantially acid free.

References Cited in the file of this patent

UNITED STATES PATENTS

| | | |
|---|---|---|
| 2,291,226 | Higgins | July 28, 1942 |
| 2,404,608 | Wells | July 23, 1946 |
| 2,447,762 | Macuga | Aug. 24, 1948 |